United States Patent [19]

Ishii et al.

[11] Patent Number: 5,130,346
[45] Date of Patent: Jul. 14, 1992

[54] METHOD FOR PRODUCING A LOW-DENSITY FLEXIBLE POLYURETHANE FOAM

[75] Inventors: Seiji Ishii; Tokuo Okada; Hiroya Fukuda; Takashi Ohashi, all of Yokohama, Japan

[73] Assignee: Bridgestone Corporation, Tokyo, Japan

[21] Appl. No.: 599,480

[22] Filed: Oct. 18, 1990

[30] Foreign Application Priority Data

Oct. 19, 1989 [JP] Japan ................... 1-272139

[51] Int. Cl.⁵ .......................................... C08G 18/06
[52] U.S. Cl. ........................... 521/163; 521/167; 521/172; 521/174
[58] Field of Search .............. 521/163, 167, 172, 174

[56] References Cited

U.S. PATENT DOCUMENTS

| | | | |
|---|---|---|---|
| 4,226,947 | 10/1980 | Yukuta et al. | 521/107 |
| 4,490,490 | 12/1984 | Patton, Jr. et al. | 521/174 |
| 4,512,831 | 4/1985 | Tillotson | 428/85 |
| 4,845,133 | 7/1989 | Priester, Jr. et al. | 521/163 |
| 4,950,694 | 8/1990 | Hager | 521/167 |
| 5,011,908 | 4/1991 | Hager | 521/174 |

FOREIGN PATENT DOCUMENTS

| | | |
|---|---|---|
| 58-29837 | 2/1983 | Japan . |
| 1-213326 | 8/1989 | Japan . |
| 773265 | 4/1957 | United Kingdom . |
| 1098127 | 1/1968 | United Kingdom . |
| 1317925 | 5/1973 | United Kingdom . |
| 1468089 | 3/1977 | United Kingdom . |
| 2103228 | 2/1983 | United Kingdom . |

*Primary Examiner*—John Kight, III
*Assistant Examiner*—John M. Cooney, Jr.
*Attorney, Agent, or Firm*—Birch, Stewart, Kolasch & Birch

[57] ABSTRACT

A method producing a low-density flexible polyurethane foam comprising stirring a starting mixture containing a polyhydroxy compound, a polyisocyanate, a foaming agent and a catalyst to thereby foam the mixture, in which a foaming agent selected from the group consisting of water, formic acid and its salts is used in an amount of at least 10% by weight as water equivalent per 100 parts by weight of the polyhydroxy compound, and the mixture is stirred at 15° C. or below by previously adjusting the temperature of the mixture to 15° C. or below and under a highly catalytic activity.

8 Claims, 1 Drawing Sheet

METHOD FOR PRODUCING A LOW-DENSITY FLEXIBLE POLYURETHANE FOAM

BACKGROUND OF THE INVENTION

1. Field of the Invention

The present invention relates to a method for producing a low-density flexible polyurethane foam favorably used as a cushion material for bedclothes and furniture, a crating material and the like.

2. Description of the Prior Art

A low-density flexible polyurethane foam has conventionally been produced by mixing starting components such as polyhydroxy compounds, polyisocyanates, foaming agents and catalysts and then stirring the mixture to foam and resinify it. This production method utilizes a polycondensation reaction which is one of polymeric synthetic reactions and is an exothermic reaction. Particularly, when water is used as a foaming agent, the heat of the foaming reaction between a polyisocyanate and water greatly contributes to heat generation during production of the flexible polyurethane foam. In this case, the reaction heat is accumulated within the flexible polyurethane foam. Although the accumulated heat at the periphery portions of the polyurethane foam is easily radiated outward with the passing of time, the heat accumulation at the central portion is only influenced to a small extent by the peripheral heat radiation, as the size of polyurethane foam block becomes larger and the central portion reaches a maximum temperature (the maximum temperature of the internal heat generation of flexible polyurethane foam is hereafter referred to as Tmax), after 15 to 30 minutes from the end of the foaming reaction. The Tmax increases in proportion to the amount of water used as a foaming agent and, for example, using 5 parts by weight of water per 100 parts by weight of a polyhydroxy compound, results in a Tmax of 165° to 170° C. Radiation of the internal heat of flexible polyurethane foam is retarded, as its size increases and therefore, thermal deterioration and oxidational deterioration due to high temperature occur at the central portion of flexible polyurethane foam block maintained at high temperature for a long period of time, resulting in not only in foam discoloration called internal scorching and reduced physical properties, but also in spontaneous ignition in an extreme case.

A method for preventing the internal scorching of polyurethane foam and its spontaneous ignition due to high temperature by adding an antioxidant to a starting mixture has conventionally been proposed (Japanese Patent Laid-open No. 68,898/1979). However, this method cannot completely solve the above problems, since its objective is not to directly control the internal temperature of polyurethane foam, especially the high internal temperature resulting from the use of at least 5 parts by weight of water, but only to prevent the oxidational deterioration and the thermal deterioration of polyurethane foam at high temperature by using an antioxidant.

On the other hand, there is a known method for producing a flexible polyurethane foam at a lower Tmax by controlling its internal temperature, in which a reduced amount of water is used and a volatile organic solvent such monochlorotrifluoromethane or methylene chloride is added as an auxiliary foaming agent. This volatile organic solvent, which is incorporated in a liquid state into a starting mixture, evaporates during foaming thereby making a flexible polyurethane foam have lower density. This method has an effect of reducing the internal temperature of the foam by vaporization heat. However, since the use of monochlorotrifluoromethane tends to be restricted because of its problem of breaking the ozone layer and the use of organic solvents such as methylene chloride tends to be restricted because of their toxicity in recent years, a foaming method without any one of these volatile organic solvents is desired.

A method for producing a low-density flexible polyurethane foam is also proposed in which formic acid is used, other than water and volatile organic solvents, as a foaming agent (Japanese Patent Laid-open No. 29,837/1983). However, since heat generation also occurs during foaming when formic acid is used, the use of a large amount of formic acid results in the internal scorching of polyurethane foam and its spontaneous ignition, as in the case, when a large amount of water is used as a foaming agent.

There is another known method for producing a flexible polyurethane foam which comprises introducing polyhydroxy compounds and polyisocyanates into a mixing tank prior to mixing them while cooling them, then placing the mixture in a mixer and adding catalysts, foaming agents and the like to the mixture to foam it (Japanese Patent Laid-open No. 213,326/1989). In this method, however, the starting materials are not previously cooled and therefore a cooling mixture chamber is required in addition to conventional installations. Besides, the purpose of cooling is to improve the physical properties by retarding the reaction.

SUMMARY OF THE INVENTION

An object of the present invention is to provide a method for producing a low-density flexible polyurethane foam which enables the Tmax to be controlled to a low level, even when a large amount of water or formic acid is used as a foaming agent and therefore can prevent the internal scorching of polyurethane foam and its spontaneous ignition during production of a large-size polyurethane foam block.

In order to achieve the above object, the present invention provides a method for producing a low-density flexible polyurethane foam comprising stirring a starting mixture containing a polyhydroxy compound, a polyisocyanate, a foaming agent and a catalyst to thereby foam the mixture, characterized in that a foaming agent selected from the group consisting of water, formic acid, its salts and mixtures thereof is used in an amount of at least 5 parts by weight as water equivalent per 100 parts by weight of the polyhydroxy compound, and the mixture is stirred at 15° C. or below by previously adjusting the temperatures of the mixture to 15° C. or below and under a highly catalytic activity.

In the conventional production of a low-density flexible polyurethane foam, the temperatures of starting components, especially polyhydroxy compounds and polyisocyanates, are previously adjusted to 20° to 25° C. before they are mixed and the mixture is stirred at a temperature of 20° to 25° C. The reason is because too high liquid temperatures result in too rapid of a reaction and unstable foaming, while too low liquid temperatures result in a retarded reaction thereby requiring a long period of time for curing and also result in unstable foaming. Therefore, polyhydroxy compounds and polyisocyanates are kept to a temperature of 20° to 25° C.

upon mixing. In contrast, in the present invention, since the liquid temperature of the mixture during stirring is maintained at 15° C. or below, which is extremely lower than the conventional liquid temperature, by previously adjusting the temperatures of the starting materials so that the temperature of the mixture becomes 15° C. or below, the Tmax can be made lower and decreased as low as at least 10° C. as compared with in case of stirring and foaming the conventional mixture at 20° to 25° C. and the Tmax can be maintained within a permissible temperature even when a large amount of water or formic acid is used as a foaming agent. Furthermore, the rise time from mixing and stirring to the end of foaming can be made equal to that required when the mixture is stirred and foamed at a normal liquid temperature (20° to 25° C.) by maintaining the highly catalytic activity during the foaming resinification reaction in order to overcome the reactivity reduction which might result from the low temperature. Accordingly, the preparation method of the present invention can reduce the internal temperature of polyurethane foam block after the end of the foaming without changing the time required for the foaming reaction, preventing any scorching and spontaneous ignition due to high temperature as well as any productivity reduction which might result from reduced reactivity and enabling a low-density flexible polyurethane foam to be safely produced at a low cost.

Therefore, the present invention provides a method for producing a low-density flexible polyurethane foam comprising the steps of:

previously adjusting a mixture containing a polyhydroxy compound, a polyisocyanates, a foaming agent and a catalyst to 15° C. or below, said catalyst being one member selected from the group consisting of water, formic acid, its salts and mixtures thereof and used in an amount of at least 5 parts by weight as water equivalent per 100 parts by weight of the polyhydroxy compound, and stirring said mixture at 15° C. or below under a highly catalytic activity to thereby foam the mixture.

BRIEF DESCRIPTION OF THE DRAWING

The above and other objects, features, and advantages of the present invention will be better understood from the following description taken in conjunction with the accompanying drawing, in which.

DETAILED DESCRIPTION OF THE INVENTION

Figure 1:
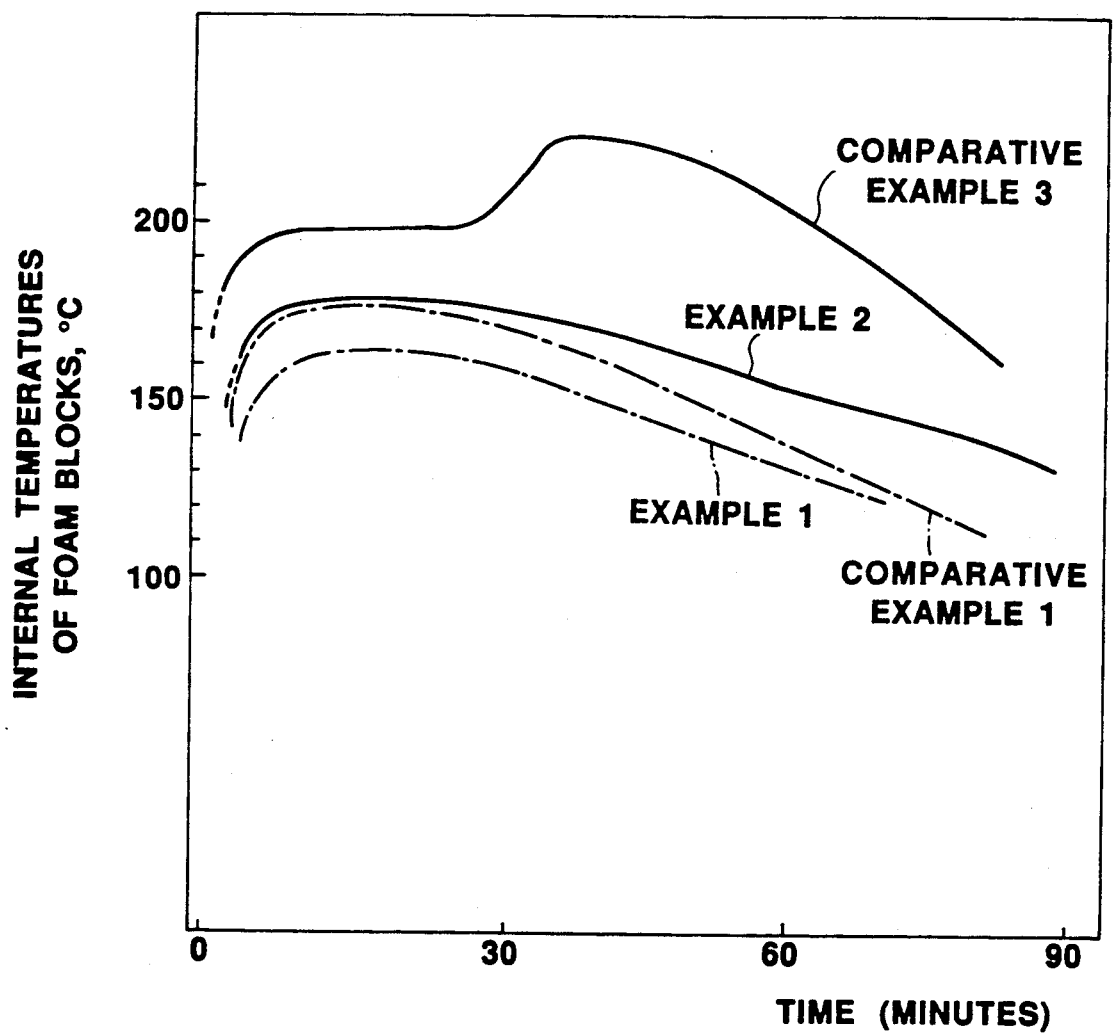
FIG. 1 indicates a graph showing successive changes in the internal temperatures of flexible polyurethane foam blocks after their production.

In the present invention, a polyhydroxy compound, a polyisocyanate, a foaming agent and a catalyst are used as starting materials.

There is no restriction as to the types of the polyhydroxy compound used in the present invention and any of those generally used for the production of flexible polyurethane foams can be used. Examples of the polyhydroxy compounds include polyether polyols terminated with a hydroxyl group, polyester polyols terminated with a hydroxyl group, polyether polyester polyols which are copolymers of the polyether polyol and the polyester polyol, and polymer polyols produced by polymerizing an ethylenically unsaturated monomer such as acrylonitrile in a polyol.

Since the viscosity of the polyhydroxy compound increases as an exponential function as its liquid temperature is decreased, it is preferably that the polyhydroxy compound used in the present invention can be homogeneously mixed with other starting materials even at low temperatures and gives fluidity to the mixture after stirring. Therefore, it is preferable to use a polyhydroxy compound having a viscosity of 200 to 10,000 cps at 0° to 15° C.

The polyhydroxy compound may have an OH value of 15 to 350 and a molecular weight of 500 to 10000.

As the polyisocyanate, any ones generally used for the production of flexible polyurethane foams can be used. Examples of the polyisocyanate include tolylene diisocyanate (TDI), crude TDI, 4,4'-diphenylmethane diisocyanate (MDI), crude MDI, aliphatic polyisocyanates in which the aliphatic group has 2 to 18 carbon atoms, alicyclic polyisocyanates in which the alicyclic group has 4 to 15 carbon atoms, aromatic polyisocyanates in which the aromatic group has 8 to 15 carbon atoms and mixtures or modified products of polyisocyanates such as prepolymers obtained by partially reacting such a polyisocyanate with the above-described polyol.

The polyisocyanate is used in an amount of 0.7 to 1.1 of OH/NCO ratio.

As the foaming agent in the present invention, water, formic acid and its salts are used singly or in combination. The hydrazine, triethylamine, dimethylbenzylamine or triethylenediamine salt of formic acid can be favorably used as the salt of formic acid. The blending amount of the foaming agent is at least 5 parts, preferably 5 to 10 parts by weight per 100 parts by weight of a polyhydroxy compound when water is used alone, and an amount equivalent to at least 5 parts, preferably 5 to 10 parts by weight of water when formic acid and its salt is used singly or in combination or a mixture of water and formic acid and/or its salt is used. In the present invention, although a small amount of a volatile solvent such as monochlorotrifluoromethane may be used as an auxiliary foaming agent for the purpose of reducing the density of the resulting foam, the use of such a volatile solvent is usually unnecessary.

There is no restriction as to the types of the catalyst used in the present invention and any of those known can be used including organic metal compounds such as lead octylate, zinc octylate, tin octylate, dibutyl tin dilaurate and sodium acetate, tertiary amines such as triethylamine, triethylenediamine, N-methyl morpholine and dimethylaminomethyl phenol, alkoxides and phenoxides of alkaline metals and alkaline earth metals such as sodium carbonate, quaternary ammonium salts such as tetraethylammonium chloride, imidazol and its derivatives such as 1-isobutyl-2-methyl-imidazole.

In the present invention, the activity of the catalyst is maintained at a high level during the foaming reaction at a low temperature. Specifically, since the liquid temperature of the starting mixture is maintained at a low level of 15° C. or below during the foaming resinification reaction, the activity of the catalyst should be maintained at a high level so that the reaction proceeds at a rate equal to that at a usual temperature (20° to 25° C.) in order to prevent any productivity reduction with preventing any foam destruction and cell roughness and achieving good balance between the foaming reaction rate and the resinification reaction rate at such a low liquid temperature. The activity of the catalyst can favorably be maintained high either by using a highly active catalyst or by increasing the amount of the catalyst. For example, one or more of tertiary amine catalysts such as tetramethyl hexamethylenediamine, tetramethyl ethylenediamine and diazabicycloundecene (DBU) and organic tin compounds such as stannous octoate and dibutyl tin dilaurate can be used as highly active catalysts. The catalyst may be used in an amount of 0.01 to 10 parts by weight, preferably 0.02 to 3 parts by weight, more preferably, 0.05 to 2.5 parts by weights per 100 parts by weight of the polyhydroxy compound.

In the present invention, other additives such as a foam-regulating agent, a filler or a fire-retarding agent can be used as required.

In the present invention, the temperature of the above starting mixture is previously adjusted to 15° C. or below. In this case it is preferable that a polyhydroxy compound and a polyisocyanate are previously cooled to 15° C. or below. Since a polyhydroxy compound and a polyisocyanate usually account for at least 90% by weight of the total amount of the starting mixture and the liquid temperature of the mixture depends upon the liquid temperatures of the above two compounds in the production of flexible polyurethane foams, the temperature of the mixture can securely be adjusted to 15° C. or below by adjusting the temperatures of these two main starting materials (polyhydroxy compound and polyisocyanate) to 15° C. or below. Alternatively, it is allowed to adjust the temperature of one of these two compounds to more than 15° C. and then adjust the temperature of the mixture to 15° C. or below. Each preferable liquid temperature of a polyhydroxy compound and a polyisocyanate is within the range of 0° to 15° C., and the problems such as viscosity increase and solidification can be avoided by adjusting the temperatures of these two compounds to within this temperature range.

The temperatures of the other starting materials for foaming such as catalysts, foaming agents and foam-regulating agents may be also previously adjusted to 15° C. or below. Alternatively, since the temperatures of these auxiliary materials minimally influence the temperature of the starting mixture, it is allowed to use these auxiliary materials at their normal liquid temperatures (20° to 25° C.) in order to avoid the complicatedness of temperature control and then adjust the liquid temperature of the starting mixture to 15° C. or below, preferably 15° to 0° C. by reducing the liquid temperatures of a polyhydroxy compound and a polyisocyanate to such an extent that the relatively high temperatures of the auxiliary materials are countervail by the low temperatures of the two compounds.

In the present invention, since the temperatures of the starting materials for foaming are previously adjusted so that the temperature of their mixture becomes 15° C. or below and the mixture is stirred while maintaining its temperature at 15° C. or below, the Tmax can be made lower than that in case that the mixture is foamed at a normal liquid temperature and, accordingly, the deterioration of the resulting flexible polyurethane foam and its spontaneous ignition can securely be prevented even when water or formic acid is used in such an amount of 5 parts by weight or more as water equivalent per 100 parts by weight of a polyhydroxy compound, at which otherwise the internal deterioration of polyurethane foam block and its spontaneous ignition due to the reaction heat at a normal liquid temperature might occur.

Furthermore, since the activity of a catalyst is maintained at a high level during the foaming resinification reaction, it is possible to avoid troubles caused by reduced liquid temperatures including an inferior foaming and a prolonged curing time resulting from a retarded reaction (productivity reduction). Therefore, a low-density flexible polyurethane foam with stable quality and free from any scorching and spontaneous ignition can be produced at a low cost by using conventional foaming installations and maintaining the conventional productivity. Moreover, since water or formic acid can be used in a larger amount with the reduction of the internal temperature of polyurethane foam according to the present invention, a low-density flexible polyurethane foam can be produced without using any volatile organic solvent such as monochlorotrifluoromethane.

Examples of the present invention are given below by way of illustration and not by way of limitation.

EXAMPLES AND COMPARATIVE EXAMPLES

Low-density flexible polyurethane foams having the formulations shown in Table 1 were produced. In the preparation process, the temperatures of mixtures (A) and (B) and component (C) were previously adjusted to the level shown in Table 1. They were introduced into a foaming stirrer and stirred at 2,000 rpm for 15 seconds. Immediately after stirring, the starting mixture for foaming was poured into a 600 mm × 600 mm × 800 mm paper mold and allowed to foam.

The following compounds were used as the components shown in Table 1.

Polyol: Poly(hydroxypropylene)triol (A polyether polyol having an OH value of 56 and a molecular weight of about 3,000; V-3022J produced by Dow Chemical Co., Ltd.)

Foam-regulating agent: Dimethylpolysiloxane surfactant (L-520 produced by Japan Unicar Co., Ltd.)

Amine catalyst: Tertiary amine catalyst (Caolizer produced by Kao Co., Ltd.)

Tin catalyst: Stannous octoate (Stanoct produced by Yoshitomi Pharmaceutical Co., Ltd.)

Isocyanate: Mixture of 2,4-tolylene diisocyanate and 2,6-tolylene diisocyanate (in a weight ratio of 8:2).

The mixture (B) was preliminarily stirred.

A thermocouple was inserted into the resulting flexible polyurethane foam block immediately after its production in such a manner that the end of the thermocouple is located in the center of the block and successive changes of its internal temperature were investigated. The results are shown in FIG. 1.

Separately, after the block was allowed to stand as is at a temperature of 20° C. and a relative humidity of 65% for two days, the discoloration degree and physical properties of a foam sample taken off from the inside of the block were examined. The results are shown in Table 1. The degree of discoloration was evaluated by measuring with a color-difference meter (a direct reading color difference computer manufactured by Suga Testing Machine Co., Ltd.) the color difference between a non-discolored part near the surface of the block and its discolored central part. A color difference Δ E of 1.5 or above indicates that distinct discoloration is observed.

TABLE 1

| | | | Comparative Example 1 | Comparative Example 2 | Example 1 | Comparative Example 3 | Example 2 | Comparative Example 4 |
|---|---|---|---|---|---|---|---|---|
| Component (parts by weight) | (A) | Polyol | 100 | 100 | 100 | 100 | 100 | 100 |
| | | Water | 5.0 | 5.0 | 5.0 | 7.0 | 7.0 | 4.8 |
| | | Foam-regulating agent | 1.5 | 1.5 | 2.0 | 1.5 | 2.0 | 1.5 |
| | (B) | Amine catalyst | 0.6 | 0.6 | 0.7 | 0.5 | 0.75 | 0.6 |
| | | Tin catalyst | 0.3 | 0.3 | 0.4 | 0.2 | 0.4 | 0.3 |
| | | Freon | — | — | — | — | — | 10 |
| | (C) | Isocyanate | 60.0 | 60.0 | 60.0 | 80.0 | 80.0 | 58.0 |
| Condition | | Temperature [°C.] of mixture | | | | | | |
| | | mixture (A) | 25 | 10 | 10 | 25 | 2 | 20 |
| | | mixture (B) | 25 | 10 | 10 | 25 | 2 | 20 |
| | | component (C) | 25 | 15 | 15 | 25 | 14 | 20 |
| | | Temperature [°C.] of the starting mixture of (A), (B) and (C) | 25 | 12 | 12 | 25 | 8 | 20 |
| | | Rise time [sec.] | 74 | 112 | 70 | 67 | 65 | 85 |
| Result | | Maximum internal temperature Tmax [°C.] | 175 | 164 | 165 | 198 | 177 | 162 |
| | | Discoloration degree [color difference Δ E] | 2.3 | 0.5 | 0.6 | 12.0 | 1.0 | 0.3 |
| | | Cell size [number/inch] | ≧30 | ≧30 | ≧30 | ≧30 | ≧30 | ≧30 |
| | | Foam density [g/cm$^3$] | 0.020 | | 0.020 | 0.016 | 0.016 | 0.016 |
| | | 25% ILD hardness [kg/200∅] | 8.8 | Internal crack | 9.2 | 8.0 | 9.0 | 7.5 |
| | | 64% ILD hardness [kg/200∅] | 22.6 | Internal crack | 25.6 | 21.0 | 24.8 | 19.7 |
| | | 50% compression permanent set [%] | 4.2 | | 2.8 | 10.5 | 5.2 | 5.5 |

It is seen from the results shown in Table 1 and FIG. 1 that the preparation method according to the present invention enables a low-density flexible polyurethane foam to be produced with a Tmax and a rise time equal to those of a conventional method (Comparative Example 4) even when at least 5 parts by weight of water is used as a foaming agent as 100 parts by weight of a polyol. In contrast, high liquid temperatures of the starting mixture resulted in a great degree of discoloration. Small amounts of catalysts (Comparative Example 2), despite the low temperatures of the starting mixture, resulted in a prolonged rise time and internal crack development because of low catalytic activity. High liquid temperatures of the starting mixture and a larger amount of water (Comparative Example 3) resulted in a significantly high Tmax (198° C.), secondary heat generation and a very great degree of discoloration.

What is claimed is:

1. A method for producing a low-density flexible polyurethane foam comprising stirring a starting mixture containing a polyhydroxy compound, a polyisocyanate, a foaming agent and a catalyst to thereby foam said mixture, characterized in that the foaming agent is a member selected from the group consisting of water, formic acid and a mixture thereof and used in an amount of at least 5 parts by weight as water equivalent per 100 parts by weight of said polyhydroxy compound, in that the catalyst is at least one member selected from the group consisting of a tertiary amine catalyst and an organic tin compound, wherein the starting mixture is stirred at 15° C. or below by previously adjusting the temperatures of said mixture to 15° C. or below and under a highly catalytic activity by using said catalyst, thereby obtaining a low-density flexible polyurethane foam having no internal scorching.

2. The method according to claim 1, wherein said polyhydroxy compound and said polyisocyanate are previously cooled to 15° C. or below.

3. The method according to claim 1, wherein said polyhydroxy compound is a member selected from the group consisting of polyether polyols terminated with a hydroxy group, polyester polyols terminated with a hydroxyl group, polyether polyester polyols which are copolymers of said polyether polyol and said polyester polyol and polymer polyols produced by polymerizing an ethylenically unsaturated monomer in a polyol.

4. The method according to claim 1, wherein said polyhydroxy compound has a viscosity of 200 to 10,000 cps at 0° to 15° C.

5. The method according to claim 1, wherein said polyisocyanate is a member selected from the group consisting of tolylene diisocyanate (TDI), crude TDI, 4,4'-diphenylmethane diisocyanate (MDI), crude MDI, aliphatic polyisocyanates in which the aliphatic group has 2 to 18 carbon atoms, alicyclic polyisocyanates in which the alicyclic group has 4 to 15 carbon atoms, aromatic polyisocyanates in which the aromatic group has 8 to 15 carbon atoms and mixtures or modified products of said polyisocyanates.

6. The method according to claim 1, wherein said catalyst is at least one member selected from the group consisting of tertiary amine catalysts and organic tin compounds.

7. The method according to claim 6, wherein said tertiary amine catalyst is tetramethyl hexamethylenediamine, tetramethyl ethylenediamine or diazabicycloundecene and said organic tin compound is stannous octoate or dibutyl tin dilaurate.

8. The method according to claim 1, wherein the catalyst is used in an amount of 1.1 to 10 parts by weight per 100 parts by weight of the polyhydroxy compound.

* * * * *